United States Patent [19]

Itagaki et al.

[11] Patent Number: 5,486,549
[45] Date of Patent: Jan. 23, 1996

[54] LOW-FOAMING WATER-BASED PRINTING INK COMPOSITION

[75] Inventors: Akinari Itagaki; Syuuichi Azechi; Satoshi Kuwata, all of Gunma; Yousuke Tsutsumi; Masanori Kodaiku, both of Osaka, all of Japan

[73] Assignees: Shin-Etsu Chemical Co., Ltd., Tokyo; Sakata Inx Corp., Osaka, both of Japan

[21] Appl. No.: 328,648

[22] Filed: Oct. 25, 1994

[30] Foreign Application Priority Data

Oct. 26, 1993 [JP] Japan ..................... 5-267202

[51] Int. Cl.$^6$ ................. C09D 5/00; C08K 3/36
[52] U.S. Cl. ............. 523/161; 524/493; 524/556; 524/561; 524/588; 252/521; 252/358; 106/26 R; 106/25 A; 106/23 K; 106/30 R
[58] Field of Search ................. 252/358, 321; 523/161; 524/561, 493, 556, 588; 106/26 R, 25 A, 23 K, 30 R

[56] References Cited

U.S. PATENT DOCUMENTS

| | | | |
|---|---|---|---|
| 3,784,479 | 1/1974 | Keil | 252/321 |
| 4,042,528 | 8/1977 | Abe | 252/358 |
| 4,504,410 | 3/1985 | Hempel et al. | 252/358 |
| 5,106,535 | 4/1992 | Mutoh et al. | 252/358 |
| 5,244,599 | 9/1993 | Terae et al. | 252/358 |
| 5,376,301 | 12/1994 | Fleuren et al. | 252/321 |
| 5,380,464 | 1/1995 | McGee et al. | 252/321 |

*Primary Examiner*—Mark Sweet
*Attorney, Agent, or Firm*—Millen, White, Zelano, & Branigan

[57] ABSTRACT

Disclosed is a water-based printing ink composition exhibiting excellently low foaming behavior with sustainability even under adverse conditions of high temperature and intense shearing force encountered in the printing works. The printing ink composition comprises, besides an organic polymer as the binder resin in the form of an aqueous solution or emulsion and a coloring agent, e.g., dyes and pigments, a silicone-based defoaming composition comprising a polyoxyalkylene-modified polydiorganosiloxane, polydimethylsiloxane, finely divided silica filler and organopolysiloxane resin mainly or solely consisting of monofunctional organosiloxane units and tetrafunctional siloxane units each in a specified weight proportion.

10 Claims, No Drawings

LOW-FOAMING WATER-BASED PRINTING INK COMPOSITION

BACKGROUND OF THE INVENTION

The present invention relates to a low-foaming water-based printing ink composition compounded with a unique silicone-based defoaming composition. More particularly, the invention relates to a novel water-based printing ink composition compounded with a silicone-based defoaming composition capable of exhibiting particularly excellent defoaming activity when compounded in a water-based printing ink composition.

Needless to say, the productivity of printing works by the use of a water-based printing ink composition largely depends on the performance or printability behavior of the printing ink composition throughout the printing process including the steps of printing on a printing press, drying and post-treatment for finishing. Water-based printing ink compositions in general in the course of the printing work, for example, are always under a high shearing force by rollers rotating at a high velocity so that foaming of the water-based printing ink composition is more or less unavoidable and the productivity of the printing work is sometimes greatly decreased due to the troubles such as eventual overflowing of the foamed ink composition from the ink feeder, irregularity or unevenness of printing density and so on.

Accordingly, it is a usual practice, with an object to decrease foaming of a water-based printing ink composition, to admix the same with a defoaming composition or antifoam agent, of which silicone-based ones prepared by emulsifying a polydimethylsiloxane in water by using a surface active agent belong to the class of the most widely used defoaming compositions.

Silicone-based defoaming compositions in the form of an aqueous emulsion, however, have a disadvantage relative to the stability. When the aqueous foaming liquid, to which the silicone-based defoaming composition is added, is heated at a high temperature or receives a high shearing force, for example, the emulsion of silicone is sometimes destroyed to cause a decrease in the defoaming activity or, in some cases, rather to promote foaming of the aqueous foaming liquid. Further, the storage stability of silicone-based defoaming compositions in the form of an aqueous emulsion in general is poor so that the phenomenon of phase separation is more or less unavoidable in a silicone-based defoaming composition of the aqueous emulsion-type after storage for a long period of time to isolate the polydimethylsiloxane forming a free oily phase. Once the phenomenon of phase separation takes place, the isolated polydimethylsiloxane exhibits water repellency so that a great decrease is caused in the quality of the printed matter prepared by using the water-based printing ink composition admixed with the defoaming agent.

In this connection, a proposal is made in U.S. Pat. No. 3,233,986 for the use of a polydimethylsiloxane as a principal ingredient of a defoaming composition, of which some of the methyl groups are replaced with polyoxyalkylene groups, but sufficiently high defoaming activity can hardly be obtained with a defoaming composition prepared by emulsifying such a polyoxyalkylene-modified polydimethylsiloxane. As a remedy for this low defoaming activity of the defoaming composition prepared from a polyoxyalkylene-modified polydimethylsiloxane, Japanese Patent Kokai No. 53-34854 proposes combined use of such a modified polydimethylsiloxane and an unmodified polydiorganosiloxane, e.g., polydimethylsiloxane, in order to enhance the defoaming activity of the defoaming composition. Such a defoaming composition added to a water-based printing ink composition, however, is defective due to eventual phase separation of the organopolysiloxane ingredients to exhibit repellency because the polydimethylsiloxane has relatively low affinity with the organic materials as the ingredients of the water-based printing ink compositions.

Attempts have of course been made to obtain a silicone-based defoaming composition particularly suitable for use in a water-based printing ink composition by introducing certain hydrocarbon groups different from methyl groups into a polydimethylsiloxane. For example, Japanese Patent Kokai No. 54-149388 proposes a self-emulsifiable silicone-based defoaming composition by the combined use of such a diorganopolysiloxane modified by introducing hydrocarbon groups having 4 to 18 carbon atoms and a polyoxyalkylene-modified polydiorganosiloxane. Though somewhat improved in respect of undesirable appearance of repellency, such a defoaming composition is unsatisfactory due to the poor sustainability of the defoaming activity.

With an object to provide a defoaming composition particularly suitable as an additive to a water-based printing ink composition with improved sustainability of the defoaming activity, the inventors in Japanese Patent Publication No. 1-30872 have previously proposed a silicone-based defoaming composition comprising a polydiorganosiloxane modified by introducing polyoxyalkylene groups of a specified structure and other modifying groups such as alkyl groups of 3 to 30 carbon atoms in combination with a polydimethylsiloxane, a finely divided silica powder and a surface active agent. The improvement achieved with this defoaming composition, however, is still not quite satisfactory in respect of the insufficient improvement in the sustainability of the defoaming activity when it is added to a water-based printing ink composition.

SUMMARY OF THE INVENTION

The present invention accordingly has an object to provide a novel and improved water-based printing ink composition compounded with a silicone-based defoaming composition particularly suitable as a defoaming additive in a water-based printing ink composition in respect of the high defoaming activity as well as excellent sustainability of the defoaming activity under very adverse conditions encountered in the printing works by overcoming the above described problems and disadvantages in the prior art low-foaming water-based printing ink compositions compounded with a silicone-based defoaming composition used at a high temperature and/or under a high shearing force.

Thus, the low-foaming water-based printing ink composition of the present invention is a uniform blend which comprises:

(A) an organic polymer as a binder resin in the form of an aqueous solution or in the form of an aqueous emulsion;

(B) a coloring agent such as dyes and pigments; and (C) a silicone-based defoaming composition, in an amount in the range from 0.01 to 10% by weight, consisting of:

(a) 100 parts by weight of a polyoxyalkylene group-containing organopolysiloxane represented by the average unit formula $$G_a R^1_b SiO_{(4-a-b)/2}, \qquad (I)$$

in which $R^1$ is a monovalent hydrocarbon group having 1 to 18 carbon atoms, G is a polyoxyalkylene group represented by the general formula $$-R^2-O-(-R^3-O-)_p-Q \qquad (II)$$

R² being a divalent hydrocarbon group having 1 to 10 carbon atoms, R³ being an ethylene group —C₂H₄— or a propylene group —C₃H₆—, Q being an atom or group selected from the class consisting of a hydrogen atom, alkyl groups having 1 to 8 carbon atoms, acetyl group and isocyanato group —NCO and the subscript p being a positive integer in the range not exceeding 200, the subscript a is a positive number in the range from 0.005 to 0.5 and the subscript b is a positive number in the range from 1.4 to 2.195 with the proviso that a+b is in the range from 1.9 to 2.2;

(b) from 2 to 200 parts by weight of a polydimethylsiloxane;

(c) from 0.1 to 40 parts by weight of a finely divided silica powder having a specific surface area of at least 50 m²/g; and (d) from 0.05 to 60 parts by weight of an organopolysiloxane resin soluble in an organic solvent which consists of the first siloxane units of the unit formula R⁴₃SiO₀.₅, referred to as the M units hereinafter, second siloxane units of the unit formula SiO₂, referred to as the Q units hereinafter, third siloxane units of the unit formula R⁴₂SiO, referred to as the D units hereinafter, and fourth siloxane units of the unit formula R⁴SiO₁.₅, referred to as the T units hereinafter, R⁴ in the unit formulas being a monovalent hydrocarbon group having 1 to 6 carbon atoms, of which the combined molar fraction of the M units and the Q units is at least 80% and the molar ratio of the M units to the Q units is in the range from 0.5 to 1.5.

DETAILED DESCRIPTION OF THE PREFERRED EMBODIMENTS

As is described above, the low-foaming water-based printing ink composition of the invention comprises, in the form of a uniform blend, (A) an organic polymer in the form of an aqueous solution or aqueous emulsion, (B) a coloring agent such as dyes and pigments and (C) a specific silicone-based defoaming composition which in turn comprises the four essential ingredients, i.e. components (a), (b), (c) and (d), in combination each in a specified weight proportion.

The type of the water-based printing ink composition of the invention, which exhibits excellent low-foaming behavior by the addition of the specific silicone-based defoaming composition in respect of the high and sustainable defoaming activity, is not particularly limitative relating to the types and combinations of the organic polymer as the binder resin and the dyes or pigments as the coloring agent.

Examples of the organic polymer which is the binder resin constituting the essential component (A) in the low-foaming water-based printing ink composition include unmodified and modified natural polymers such as starch, dextrin, animal glue, casein, shellac, gum arabic, rosin, rosin esters and the like, cellulose ethers such as methyl cellulose, ethyl cellulose and the like and synthetic resins such as rosin-modified or unmodified phenolic resins, unmodified or modified maleic acid resins, copolymeric resins of styrene and maleic acid, copolymeric resins of styrene, maleic acid and an acrylic ester, petroleum resins, vinyl resins, acrylic resins, polyamide resins, epoxy resins, alkyd resins, polyvinyl alcohols and the like. These polymers can be used either singly or as a combination of two-kinds or more according to need in the form of a neutral or alkaline aqueous solution or in the form of an aqueous emulsion depending on the solubility behavior thereof in water.

The content of the organic polymer in the inventive water-based printing ink composition is usually in the range from 3 to 30% by weight when the polymer is soluble in neutral or alkaline aqueous medium. When the polymer is used as an aqueous emulsion, the content of the polymer in the printing ink composition can be as high as 60% by weight. When the amount of the binder resin is too small, the printing ink composition cannot be imparted with an appropriate viscosity suitable for printing resulting in poor printability of the ink composition and the mechanical strength of the ink film formed by printing is low. When the amount of the binder resin is too large, on the other hand, the viscosity of the ink composition is unduly high with poor flowability of the ink composition requiring dilution with a large volume of a thinner so that the color density cannot be high enough.

The coloring agent as the component (B) in the inventive water-based printing ink composition is also not particularly limitative including various kinds of dyes and inorganic and organic pigments. The dyes suitable for use in the inventive water-based printing ink composition include azo dyes, anthraquinone dyes, indigo dyes, phthalocyanine dyes, carbonyl dyes, quinoneimine dyes, methine dyes, quinoline dyes, nitro dyes and the like. Examples of the inorganic pigments include titanium dioxide, red iron oxide, antimony vermilion, cadmium red, cadmium yellow, cobalt blue, Prussian blue, ultramarine, carbon black, graphite powder and the like and examples of the organic pigments include soluble azo pigments, insoluble azo pigments, azo lake pigments, condensed azo pigments, copper phthalocyanine pigments, condensed polycyclic pigments and the like. These dyes and pigments can be used either singly or as a combination of two kinds or more according to need.

The amount of these coloring agents in the inventive water-based printing ink composition is in the range from 0.1 to 5% by weight when the coloring agent is a dye or in the range from 0.5 to 60% by weight when the coloring agent is a pigment. When the amount of the coloring agent is too small, the color density obtained by printing with the printing ink composition cannot be as high as desired while, when the amount thereof is too large, the dispersion stability of the coloring agent is decreased.

The component (a) as an essential ingredient in the silicone-based defoaming composition as the component (C) in the inventive low-foaming water-based printing ink composition is a polyoxyalkylene group-containing organopolysiloxane represented by the average unit formula (I) given above. In this formula, R¹ is a monovalent hydrocarbon group having 1 to 18 carbon atoms exemplified by alkyl groups such as methyl, ethyl, propyl, butyl, pentyl, hexyl, heptyl, octyl, nonyl, decyl, dodecyl, tetradecyl, hexadecyl and octadecyl groups, cycloalkyl groups such as cyclohexyl group, alkenyl groups such as vinyl and allyl groups, aryl groups such as phenyl and tolyl groups and aralkyl groups such as benzyl and 2-phenylethyl groups as well as substituted hydrocarbon groups obtained by replacing a part or all of the hydrogen atoms in the above named hydrocarbon groups with halogen atoms, cyano groups and the like such as chloromethyl, 3-chloropropyl, 3,3,3-trifluoropropyl and 2-cyanoethyl groups. It is preferable that at least 80% by moles of the groups denoted by R¹ in a molecule of the organopolysiloxane are methyl groups in respect of the high defoaming activity of the defoaming agent prepared from such an organopolysiloxane as the component (a) and in respect of the economical advantages.

The symbol G in the average unit formula (I) denotes a polyoxyalkylene group represented by the general formula (II) given above. In this formula, $R^2$ is a divalent hydrocarbon group having 1 to 10 carbon atoms exemplified by methylene, ethylene, propylene, butylene, hexylene, octylene and decylene groups, $R^3$ is an ethylene group or a propylene group and Q at the free end of the polyoxyalkylene group is an atom or group selected from the class consisting of a hydrogen atom, alkyl groups having 1 to 8 carbon atoms, e.g., methyl, ethyl, propyl, butyl, hexyl and octyl groups, acetyl group and isocyanato group. The subscript p in the formula (II) is a positive integer which is preferably not exceeding 200 or, more preferably, in the range from 5 to 100.

The subscripts a and b in the average unit formula (I) are each a positive number and a is in the range from 0.005 to 0.5 or, preferably, from 0.01 to 0.1 and b is in the range from 1.4 to 2.195 or, preferably, from 1.8 to 2.19 with the proviso that a +b is in the range from 1.9 to 2.2. This limitation means that the organopolysiloxane has a generally linear molecular structure although a small amount of branched structures can be included without particular disadvantages. The polyoxyalkylene group-containing organopolysiloxane as the component (a) should have a viscosity in the range from 10 to 100,000 centistokes or, preferably, from 100 to 10,000 centistokes. When the component (a) is in a wax-like form at room temperature, the above mentioned viscosity refers to the viscosity of the melt thereof. When the viscosity thereof is too low, a decrease is caused in the stability of the defoaming composition prepared therefrom while, when the viscosity thereof is too high, a difficulty is encountered in the compounding work of the defoaming composition with the other components of the water-based printing ink composition to cause a decrease in the productivity as a consequence of the low dispersibility of the defoaming composition.

Polyoxyalkylene group-containing organopolysiloxanes suitable as the component (a) in the silicone-based defoaming composition as the component (C) can be prepared by a method known in the art of silicones involving the so-called hydrosilation reaction. Namely, an organopolysiloxane having hydrogen atoms-directly bonded to the silicon atoms is admixed with a polyoxyalkylene compound having an aliphatically unsaturated group such as vinyl and allyl groups at one of the molecular chain ends together with a catalytic amount of a platinum compound as a catalyst and the mixture is heated so that an addition reaction takes place between the silicon-bonded hydrogen atoms in the organopolysiloxane and the unsaturated terminal groups of the polyoxyalkylene compound so as to introduce the polyoxyalkylene groups as the pendants to the molecular chains of the polysiloxane. Polyoxyalkylene group-containing organopolysiloxanes of several grades are available on the market and can be used as such as the component (a). It is of course that the polyoxyalkylene moiety is not limited to a particular single type but can be a combination of oxyethylene groups and oxypropylene groups or a combination of polyoxyalkylene groups having different degrees of polymerization corresponding to the value of p in the general formula (II).

The dimethyl polysioxane as the component (b) in the silicone-based defoaming composition as the component (C) is the principal ingredient which serves to impart the composition with sustainability of the defoaming activity. The molecular structure of the polydimethylsiloxane is not particularly limitative including linear and branched ones and each of the terminal groups at the molecular chain ends can be a trimethyl silyl group, hydroxy dimethyl siloxy group and the like though not particularly limited thereto. It is essential that the polydimethylsiloxane as the component (b) has a viscosity in the range from 100 to 1,000,000 centistokes at 25° C. although the viscosity should be as low as possible in order to exhibit good dispersibility and suppression of repellency and should be as high as possible from the standpoint of good sustainability of the defoaming activity. In particular, the viscosity should be at least 1000 centistokes from the standpoint of obtaining good miscibility with the polyoxyalkylene group-modified organopolysiloxane as the component (a) and affinity with various organic constituents contained in the water-based printing ink compositions but should not exceed 100,000 centistokes in respect of the dispersibility. The amount of the component (b) in the inventive defoaming composition is in the range from 2 to 200 parts by weight per 100 parts by weight of the component (a). When the amount thereof is too small relative to the component (a), the defoaming composition cannot exhibit full defoaming activity while, when the amount thereof is too large, dispersibility and stability of the defoaming composition is decreased as a consequence of the high hydrophobicity with eventual appearance of repellency. Preferably, the amount of the component (b) is in the range from 5 to 100 parts by weight per 100 parts by weight of the component (a) from the standpoint of obtaining good dispersibility and high defoaming activity.

The component (c) in the silicone-based defoaming composition as the component (C) is a finely divided silica powder. Various grades of so-called silica fillers manufactured by a wet process or dry process are available on the market including precipitated silica fillers, fumed silica fillers, silica xerogels and the like either before or after a hydrophobilizing surface treatment by the substitution of organosilyl groups for the silanolic hydroxy groups on the surface of the silica particles. Commercial silica filler products usable as the component (c) include Aerosils by Nippon Aerosil Co., Nipsils by Nippon Silica Co., Cab-o-sils by Cabot Corp., Santocels by Monsanto Co. and the like though not particularly limitative thereto. It is preferable to use a finely divided silica powder having a specific surface area of at least 50 m$^2$/g as measured by the so-called BET method and an average particle diameter not exceeding 100 μm as the component (c). The amount of the finely divided silica powder as the component (c) in the silicone-based defoaming composition is in the range from 0.1 to 40 parts by weight or, preferably, from 1 to 20 parts by weight per 100 parts by weight of the component (a) in order to have the defoaming activity of the composition fully exhibited. When the amount of the component (c) is too large, difficulties are encountered in the compounding work of the silica powder with the other ingredients of the defoaming composition and in handling of the defoaming composition having too high consistency.

The component (d) in the silicone-based defoaming composition as the component (C) is a specific organopolysiloxane resin having solubility in organic solvents which serves to impart the silicone-based defoaming composition with sustainability of the defoaming activity and to prevent occurrence of oil spots and appearance of repellency. The organopolysiloxane resin consists of four kinds of the siloxane units including the first siloxane units of the unit formula $R^4_3SiO_{0.5}$, referred to as the M units hereinafter, second siloxane units of the unit formula $SiO_2$, referred to as the Q units hereinafter, third siloxane units of the unit formula $R^4_2SiO$, referred to as the D units hereinafter, and fourth siloxane units of the unit formula $R^4SiO_{1.5}$, referred to as the T units hereinafter, $R^4$ in the unit formulas being a monovalent hydrocarbon group having 1 to 6 carbon atoms exemplified by alkyl groups such as methyl, ethyl, propyl, butyl, pentyl and hexyl groups and phenyl group. It is preferable that at least 80% by moles of the groups denoted by $R^4$ in the component (d) are methyl groups.

Among the above mentioned four kinds of the siloxane units M, Q, D and T, the units M and Q are the only essential siloxane units and it is preferable that at least 80% by moles or, more preferably, at least 90% by moles of the siloxane units forming the organopolysiloxane resin as the component (d) are selected from the siloxane units M and Q because, when the molar fraction of the siloxane units of these types is too small, the desired sustainability of the defoaming activity of the defoaming composition cannot be fully obtained. It is further preferable that the molar ratio of the siloxane units M to the siloxane units Q in the resin, referred to as the M:Q ratio hereinafter, is in the range from 0.5 to 1.5. or, more preferably, from 0.7 to 1.2. When the M:Q ratio is too small, the organopolysiloxane resin is poorly dispersible in the defoaming composition while, when the ratio is too large, a decrease is caused in the sustainability of the defoaming activity with eventual appearance of repellency. The amount of the organopolysiloxane resin as the component (d) in the defoaming composition as the component (C) is in the range from 0.05 to 60 parts by weight or, preferably, from 0.5 to 30 parts by weight per 100 parts by weight of the component (a) in order to obtain good defoaming activity of the defoaming composition.

The defoaming composition as the component (C) can be prepared by uniformly blending the above described components (a), (b), (c) and (d) and other optional additives each in a specified amount using a suitable mixing machine such as homomixers and the like. The sequential order of mixing of the four essential components is not particularly limitative. For example, all of the four components can be mixed together at one time or the components (b), (c) and (d) are first mixed together to form a mixture to which the component (a) is added and mixed together into a uniform blend of the four components. It is sometimes advantageous that mixing of these essential and optional components is conducted at an elevated temperature of, for example, 40° to 200° C.

The water-based printing ink composition of the invention is prepared by uniformly compounding the binder resin as the component (A) with a coloring agent such as dyes and organic or inorganic pigments as the component (B) and the silicone-based defoaming composition as the component (C) as well as other optional additives such as waxes, plasticizers, stabilizers, thickening agents, dispersion aids, fillers, solvents and the like according to need.

When a low-foaming water-based printing ink composition is to be prepared according to the invention, an organic polymer and a coloring agent are uniformly admixed or kneaded together with the above described defoaming composition and, if necessary, other optional additives in a suitable mixing machine such as roller mills, ball mills, attrition mills, sand mills, dissolvers, homomixers and the like. The amount of the defoaming composition in the thus prepared low-foaming water-based printing ink composition is in the range from 0.01 to 10% by weight or, preferably, from 0.1 to 1% by weight. When the amount of the defoaming composition is too small, no sufficiently high defoaming effect can be obtained as a matter of course while, when the amount of the defoaming composition is too large, the printed matter obtained by printing with the ink composition would be defective due to appearance of repellency.

In the following, Examples and Comparative Examples are given to illustrate the low-foaming water-based printing ink compositions of the invention in more detail as preceded by the description of the procedure for the preparation of the binder resins as the component (A). In the following description, the term of "parts" always refers to "parts by weight" and the values of the viscosity all refer to the values determined at 25° C. if not otherwise mentioned.

Preparation of Binder Resin 1.

Into a four-necked flask equipped with a stirrer, reflux condenser, thermometer and gas-inlet tube were introduced 600 parts of ethyl acetate which was heated and kept at 75° to 78° C. under a stream of nitrogen gas. A monomer mixture composed of 249 parts of monobutyl maleate, 151 parts of styrene and 4 parts of di-tert-butyl peroxide as a polymerization initiator was added dropwise into the flask taking about 2 hours to form a polymerization mixture which was agitated for further 2 hours at the same temperature to effect copolymerization of the monomers. After completion of the polymerization reaction, the polymerization mixture was freed from the solvent by stripping under reduced pressure to give a solid copolymeric resin of maleic acid and styrene.

A water-based resin vanish, referred to as the water-based varnish I hereinafter, was prepared by adding 400 parts of the above prepared copolymeric resin as crushed to 600 parts of an aqueous medium containing an equivalent amount of ammonia and agitating the mixture at 80° C. so as to dissolve the copolymeric resin in the aqueous medium. The water-based vanish thus prepared had a viscosity of 20 poise at 20° C. and the content of non-volatile matter therein was 40% by weight.

Preparation of Binder Resin 2.

The procedure for the preparation of a copolymeric resin of styrene, maleic acid and an acrylic ester was substantially the same as in the above except that the monomer mixture added to 600 parts of ethyl acetate was composed of 158 parts of monobutyl maleate, 161 parts of styrene, 81 parts of butyl acrylate and 4 parts of di-tert-butyl peroxide.

Another water-based resin varnish, referred to as the water-based varnish II hereinafter, was prepared in substantially the same manner as the water-based varnish I by dissolving 400 parts of the above prepared copolymeric resin as crushed in 600 parts of an aqueous medium containing an equivalent amount of ammonia. The water-based varnish thus prepared had a viscosity of 18 poise at 20° C. and the content of non-volatile matter therein was 40% by weight.

EXAMPLE 1

A defoaming composition, referred to as the defoaming composition 1 hereinafter, was prepared by mixing:

100 parts of a polyoxyalkylene group-containing organopolysiloxane expressed by the average unit formula $G^1_{0.1}(CH_3)_{2.0}SiO_{0.95}$, in which $G^1$ is a polyoxyalkylene group of the formula —$C_3H_6$—O—(—$C_2H_4$—O—)$_{25}$—(—$C_3H_6$—O—)$_{25}$—$C_4H_9$, having a viscosity of 1400 centistokes, referred to as the component (a1) hereinafter;

40 parts of a polydimethylsiloxane having a viscosity of 5000 centistokes and terminated at each molecular chain end with a trimethyl silyl group, referred to as the component (b1) hereinafter;

5 parts of a fumed silica filler having a specific surface area of about 300 m$^2$/g (Aerosil 300, a product by Nippon Aerosil Co.); and 5 parts of an organopolysiloxane resin consisting of the siloxane units of the formula $(CH_3)_3SiO_{0.5}$ (M units) and the siloxane units of the formula $SiO_2$ (Q units) alone in a molar ratio M:Q of 0.85, referred to as the component (d1) hereinafter, and, after heating at 60° C., the mixture was uniformly kneaded in a homomixer.

A water-based printing ink composition for testing purpose was prepared by uniformly mixing 30 parts of a first commercial water-based printing ink varnish (Johncryl 62, a product by Johnson Co.), 20 parts of a second commercial water-based printing ink varnish (Johncryl 89, a product of the same company as above), 20 parts of a pigment (Fastgen Blue TGR, a product by Dai-nippon Ink Chemicals Co.), 5 parts of isopropyl alcohol, 4 parts of polyethylene wax, 26 parts of water and 0.3 part of the silicone-based defoaming composition 1. This water-based printing ink composition was subjected to the test in three different ways described below.

The first of the testing procedures, referred to as the beaker test hereinafter, was as follows. Thus, a 200 g portion of the test printing ink composition was taken in a tall beaker of 1000 ml capacity and agitated for 60 minutes or 120 minutes at room temperature with a low-viscosity type homomixer rotating at 7000 rpm to cause foaming of the printing ink composition. Recording was made of the height of the layer of foams in mm in the tall beaker. With an object to examine the sustainability of the defoaming activity, the same foaming test as above was undertaken with the ink composition admixed with the defoaming composition after storage for 7 days in a hermetically sealed container at 40° C. The results are shown in Table 1.

The second of the testing procedures, referred to as the printing press test hereinafter, was as follows. Thus, a test printing run was conducted on a flexographic two-color printing press with the above prepared test ink composition and, when a stationary state of running was established, the condition of foaming of the ink composition on the ink pad was visually examined and the results were recorded in four ratings of: A for absolute absence of foams; B for coverage of only the corner areas of the ink pad with foams; C for complete coverage of the ink pad with foams; and D for a large volume of foams to cause overflowing of the ink composition from the ink pad or interruption of suction of the ink composition with a pump. This test was undertaken with the test ink composition as prepared and after silorage for 7 days at 40° C. in a hermetically sealed container. The results are shown also in Table 1.

The third of the testing procedures, referred to as the repellency test hereinafter, was as follows. Thus, the test ink composition was applied to and spread over the surface of a sheet of water-repellent liner paper by using a wire-bar coater of 0.15 mm diameter and the condition of repellency was visually examined after drying making comparison with the condition obtained with a control ink composition without addition of the defoaming composition to record the results in four ratings off A for just the same condition as the control composition; B for substantially the same condition as the control composition though with a little appearance of repellency; C for the presence of a small number of spots of repellency; and D for the presence of a large number of spots of repellency. The results are shown in Table 1.

EXAMPLE 2

The formulation of the silicone-based defoaming composition, referred to as the defoaming composition 2 hereinafter, and the testing procedures of the ink composition compounded therewith were substantially the same as in Example 1 except that the polyoxyalkylene group-containing organopolysiloxane, i.e. component (a1), was replaced with the same amount of another polyoxyalkylene group-containing organopolysiloxane, referred to as the component (a2) hereinafter, expressed by the average unit formula $G^2_{0.03}(C_{10}H_{21})_{0.03}(CH_3)_{1.98}SiO_{0.98}$, in which $G^2$ was a polyoxyalkylene group of the formula $-C_3H_6-O-(-C_2H_4-O-)_6-(-C_3H_6-O-)_{24}-$ H, having a viscosity of 1100 centistokes. The results of testing are shown in Table 1.

EXAMPLE 3

The formulation of the silicone-based defoaming composition, referred to as the defoaming composition 3 hereinafter, and the testing procedures of the ink composition compounded therewith were substantially the same as in Example 1 except that the polyoxyalkylene group-containing organopolysiloxane, i.e. component (a1), was replaced with the same amount of a third polyoxyalkylene group-containing organopolysiloxane, referred to as the component (a3) hereinafter, expressed by the average unit formula $G^3_{0.08}G^4_{0.02}(C_8H_{17})_{0.03}(CH_3)_{1.93}SiO_{0.97}$, in which $G^3$ is a polyoxyalkylene group of the formula $-C_3H_6-O-(-C_2H_4-O-)_3-CH_3$ and $G^4$ is a polyoxyalkylene group of the formula $-C_3H_6-O-(-C_2H_4-O-)_{30}-CH_3$, having a viscosity of 5000 centistokes at 40° C. with a melting point of 35° to 36° C. The results of testing are shown in Table 1.

EXAMPLE 4

The formulation-of the silicone-based defoaming composition, referred to as the defoaming composition 4 hereinafter, and the testing procedures of the ink composition compounded therewith were substantially the same as in Example 2 except that the polydimethylsiloxane, i.e. component (b1), was replaced with the same amount of another polydimethylsiloxane, referred to as the component (b2) hereinafter, having a viscosity of 3000 centistokes and terminated at each molecular chain end with a hydroxy dimethyl silyl group. The results of testing are shown in Table 1.

EXAMPLE 5

The formulation of the silicone-based defoaming composition, referred to as the defoaming composition 5 hereinafter, and the testing procedures of the ink composition compounded therewith were substantially the same as in Example 4 except that the organopolysiloxane resin, i.e. component (d1), was replaced with the same amount of another organopolysiloxane resin, referred to as the component (d2) hereinafter, consisting of 50% by moles of the siloxane units of the formula $(CH_3)_3SiO_{0.5}$ and 50% by moles of the siloxane units of the formula $SiO_2$. The results of testing are shown in Table 1.

EXAMPLE 6

The formulation of the silicone-based defoaming composition, referred to as the defoaming composition 6 hereinafter, and the testing procedures of the ink composition compounded therewith were substantially the same as in Example 3 except that the amount of the component (b1) was decreased from 40 parts to 27 parts and the organopolysiloxane resin, i.e. component (d1), was replaced with the same amount of the component (d2) used in Example 5. The results of testing are shown in Table 1.

EXAMPLE 7

The formulation of the silicone-based defoaming composition, referred to as the defoaming composition 7 hereinafter, and the testing procedures of the ink composition compounded therewith were substantially the same as in Example 1 except that the amount of the component (d1) was decreased from 5 parts to 0.5 part. The results of testing are shown in Table 1.

EXAMPLE 8

The formulation of the silicone-based defoaming composition, referred to as the defoaming composition 8 hereinafter, and the testing procedures of the ink composition compounded therewith were substantially the same as in Example 1 except that the amount of the component (b1) was increased from 40 parts to 100 parts, the amount of the fumed silica filler was increased from 5 parts to 15 parts and 5 parts of the component (d1) were replaced with 25 parts of the component (d2) used in Example 5. The results of testing are shown in Table 1.

EXAMPLE 9

The formulation of the silicone-based defoaming composition, referred to as the defoaming composition 9 hereinafter, was substantially the same as in Example 1 except that the amount of the component (b1) was decreased from 40 parts to 5 parts, the amount of the fumed silica filler was decreased from 5 parts to 1 part and the amount of of the component (d1) was decreased from 5 parts to 1 part. A water-based printing ink composition for testing was prepared in the same formulation as in Example 1 excepting replacement of 0.3 part of the defoaming composition 1 with 1 part of the above prepared defoaming composition 9. The results of testing undertaken in the same manner as in the preceding examples are shown in Table 1.

EXAMPLE 10

The same testing procedures as in the preceding examples were undertaken for a water-based printing ink composition prepared from 45 parts of the water-based varnish I, 20 parts of the same pigment as in Example 1, 5 parts of isopropyl alcohol, 4 parts of polyethylene wax, 26 parts of water and 0.3 part of the defoaming composition 1 prepared in Example 1. The results of testing are shown in Table 1.

EXAMPLE 11

The formulation and testing procedures were substantially the same as in Example 10 excepting replacement of the water-based varnish 1 with the same amount of the water-based varnish 2. The results of testing are shown in Table 1.

Comparative Example 1

The formulation of the silicone-based defoaming composition, referred to as the defoaming composition 10 hereinafter, and the testing procedures of the ink composition compounded therewith were substantially the same as in Example 1 except that the amount of the component (b1) was increased from 40 parts to 45 parts and the component (d1) was omitted. The results of testing are shown in Table 1.

Comparative Example 2

The formulation of the silicone-based defoaming composition, referred to as the defoaming composition 11 hereinafter, and the testing procedures of the ink composition compounded therewith were substantially the same as in Example 2 except that the amount of the component (b1) was increased from 40 parts to 45 parts and the amount of the component (d1) was increased from 5 parts to 65 parts. The results of testing are shown in Table 1.

Comparative Example 3

The formulation of the silicone-based defoaming composition, referred to as the defoaming composition 12 hereinafter, and the testing procedures of the ink composition compounded therewith were substantially the same as in Example 1 except that the amount of the component (b1) was increased from 40 parts to 220 parts. The results of testing are shown in Table 1.

Comparative Example 4

The formulation of the silicone-based defoaming composition, referred to as the defoaming composition 13 hereinafter, and the testing procedures of the ink composition compounded therewith were substantially the same as in Example 1 except that the amount of the component (b1) was decreased from 40 parts to 1 part. The results of testing are shown in Table 1.

Comparative Example 5

The formulation of the silicone-based defoaming composition, referred to as the defoaming composition 14 hereinafter, and the testing procedures of the ink composition compounded therewith were substantially the same as in Example 1 except that the fumed silica filler was omitted. The results of testing are shown in Table 1.

Comparative Example 6

The formulation of the silicone-based defoaming composition, referred to as the defoaming composition 15 hereinafter, and the testing procedures of the ink composition compounded therewith were substantially the same as in Example 1 except that the amount of the fumed silica filler was increased from 5 parts to 45 parts. The results of testing are shown in Table 1.

TABLE 1

| | Foam height in beaker test, mm | | Printing press test | |
|---|---|---|---|---|
| | as prepared, 60/120 minutes | after storage 60/120 minutes | as prepared/ after storage | Repellency test |
| Example No. | | | | |
| 1 | 6/10 | 8/12 | B/B | A |
| 2 | 5/7 | 7/10 | A/B-A | A |
| 3 | 3/5 | 5/6 | A/A | A |
| 4 | 6/7 | 8/10 | A/A | A |
| 5 | 8/11 | 9/12 | B/B | A |
| 6 | 7/8 | 8/10 | A/B | A |
| 7 | 7/13 | 9/16 | B/B | B |
| 8 | 3/6 | 6/11 | A/B | B |
| 9 | 6/9 | 8/13 | A/B | A |
| 10 | 6/10 | 8/12 | B/B | A |
| 11 | 6/10 | 8/12 | B/B | A |
| Comparative Example No. | | | | |
| 1 | 10/18 | 20/27 | C/D | D |
| 2 | 12/18 | 18/25 | C/C | C |
| 3 | 8/20 | 22/28 | C/C | D |
| 4 | 26/32 | 30/35 | D/D | C |
| 5 | 32/35 | 35/39 | D/D | C |
| 6 | 7/23 | 20/33 | C/D | D |

What is claimed is:

1. A low-foaming water-based printing ink composition which comprises, as a uniform blend:

(A) an organic polymer in the form of an aqueous solution or in the form of an aqueous emulsion;

(B) a coloring agent; and (C) a silicone-based defoaming composition, in an amount in the range from 0.01 to 10% by weight, comprising:

(a) 100 parts by weight of a polyoxyalkylene group-containing organopolysiloxane represented by the average unit formula $G_a R^1_b SiO_{(4-a-b)/2}$, in which $R^1$ is a monovalent hydrocarbon group having 1 to 18 carbon atoms, G is a polyoxyalkylene group represented by the general formula $-R^2-O-(-R^3-O-)_p-Q$, $R^2$ being a divalent hydrocarbon group having 1 to 10 carbon atoms, $R^3$ being an ethylene group $-C_2H_4-$ or a propylene group $-C_3H_6-$, Q being an atom or group selected from the class consisting of a hydrogen atom, alkyl groups having 1 to 8 carbon atoms, acetyl group and isocyanato group $-NCO$ and the subscript p being a positive integer not exceeding 200, the subscript a is a positive number in the range from 0.005 to 0.5 and the subscript b is a positive number in the range from 1.4 to 2.195 with the proviso that a+b is in the range from 1.9 to 2.2;

(b) from 2 to 200 parts by weight of a polydimethylsiloxane having a viscosity in the range from 100 to 1,000,000 centistokes at 25° C.;

(c) from 0.1 to 40 parts by weight of a finely divided silica powder having a specific surface area of at least 50 m²/g; and (d) from 0.05 to 60 parts by weight of an organopolysiloxane resin soluble in an organic solvent which consists of the siloxane units of the unit formula $R^4_3SiO_{0.5}$, siloxane units of the unit formula $SiO_2$, siloxane units of the unit formula $R^4_2SiO$ and siloxane units of the unit formula $R^4SiO_{1.5}$, $R^4$ in the unit formulas being a monovalent hydrocarbon group having 1 to 6 carbon atoms, of which the combined molar fraction of the siloxane units of the formula $R^4_3SiO_{0.5}$ and the siloxane units of the formula $SiO_2$ is at least 80% and the molar ratio of the siloxane units of the formula $R^4_3SiO_{0.5}$ to the siloxane units of the formula $SiO_2$ is in the range from 0.5 to 1.5.

2. The low-foaming water-based printing ink composition as claimed in claim 1 in which the subscripts a and b in the general formula representing the component (a) are each a positive number in the range from 0.01 to 0.1 and in the range from 1.8 to 2.19, respectively.

3. The low-foaming water-based printing ink composition as claimed in claim 1 in which at least 80% by moles of the groups denoted by $R^1$ in the general formula representing the component (a) are methyl groups.

4. The low-foaming water-based printing ink composition as claimed in claim 1 in which the subscript p in the general formula representing the group denoted by Q is a positive integer in the range from 5 to 100.

5. The low-foaming water-based printing ink composition as claimed in claim 1 in which the subscript a in the general formula representing the component (a) is a positive number in the range from 0.01 to 0.1.

6. The low-foaming water-based printing ink composition as claimed in claim 1 in which the amount of the component (b) is in the range from 5 to 100 parts by weight per 100 parts by weight of the component (a).

7. The low-foaming water-based printing ink composition as claimed in claim 1 in which the amount of the component (c) is in the range from 1 to 20 parts by weight per 100 parts by weight of the component (a).

8. The low-foaming water-based printing ink composition as claimed in claim 1 in which at least 80% by moles of the groups denoted by $R^4$ in the component (d) are methyl groups.

9. The low-foaming water-based printing ink composition as claimed in claim 1 in which the molar ratio of the siloxane units of the formula $R^4_3SIO0.5$ to the siloxane units of the formula $SiO_2$ in the component (d) is in the range from 0.7 to 1.2.

10. The low-foaming water-based printing ink composition as claimed in claim 1 in which the amount of the component (d) is in the range from 0.5 to 30 parts by weight per 100 parts by weight of the component (a).

* * * * *